United States Patent
Wang

(10) Patent No.: US 7,093,053 B2
(45) Date of Patent: Aug. 15, 2006

(54) CONSOLE CHIP AND SINGLE MEMORY BUS SYSTEM

(75) Inventor: Tai-Cheng Wang, Hsinchu (TW)

(73) Assignee: V. R. Technology Co., Ltd., Hsinchu (TW)

( * ) Notice: Subject to any disclaimer, the term of this patent is extended or adjusted under 35 U.S.C. 154(b) by 326 days.

(21) Appl. No.: 10/763,670

(22) Filed: Jan. 24, 2004

(65) Prior Publication Data

US 2005/0165986 A1     Jul. 28, 2005

(51) Int. Cl.
*G06F 13/14* (2006.01)

(52) U.S. Cl. ............. 710/305; 710/306; 710/240; 710/107

(58) Field of Classification Search ........... 710/309, 710/27; 725/37–43; 348/116, 119
See application file for complete search history.

(56) References Cited

U.S. PATENT DOCUMENTS

| | | | | |
|---|---|---|---|---|
| 5,566,306 A | * | 10/1996 | Ishida | 710/309 |
| 5,630,174 A | * | 5/1997 | Stone et al. | 710/63 |
| 5,802,597 A | * | 9/1998 | Nelsen | 711/169 |
| 6,012,089 A | * | 1/2000 | Hasegawa | 725/89 |
| 6,205,524 B1 | * | 3/2001 | Ng | 711/151 |
| 2003/0204853 A1 | * | 10/2003 | Fries et al. | 725/93 |

* cited by examiner

*Primary Examiner*—Rehana Perveen
*Assistant Examiner*—Kim T. Huynh

(57) ABSTRACT

A single memory bus multi-media computer system is provided, including a CPU/Sound/Graphic unit, a bus arbitrator, a program and sound and graphic memory for communicating with the CPU/Sound/Graphic unit and the bus arbitrator. Only a single memory bus is required as communication is through the bus arbitrator. The addition of the bus-arbitrator can relieve the CPU/Sound/Graphic unit from performing bus synchronization and waiting for the slow memory to catch up.

7 Claims, 5 Drawing Sheets

CONSOLE CHIP AND SINGLE MEMORY BUS SYSTEM

FIELD OF THE INVENTION

This invention relates to a multi-media computer system, and more particularly to a multi-media computer system with a single bus shared by audio, video, and application programs.

BACKGROUND OF THE INVENTION

As the technology progresses rapidly, the multi-media computer system is now widely available at an affordable price to most users. Conventional multi-media computer systems are usually designed to accommodate add-on audio video functional modules, so that existing systems can be upgraded. Hence, the synchronization of many data and control buses plays an important role in determining the performance of the multi-media computer system.

FIG. 1 shows a conventional two-bus system, including a CPU/Sound/Graphic unit 11, a program and sound memory 12, a graphic memory 13, a TV/LCD signal unit 14, a program and sound bus 15, and a graphic bus 16. CPU/Sound/Graphic unit 11 communicates with program and sound memory 12 through program and sound bus 15, while with graphic memory 13 through graphic memory 16. After processing, the displayed data are then sent to TV/LCD signal unit 14, and separated into video output, and audio outputs.

Conventional structure of two-bus multi-media computer systems has several shortcomings due to having two buses. As the CPU/Sound/Graphic unit 11 can only communicate with a memory at one time, the two buses must be synchronized in communicating with CPU/Sound/Graphic unit 11. The synchronization adds extra overhead to CPU/Sound Graphic unit 11 and wastes precious processing cycles. Further more, the circuit complexity of CPU/Sound/Graphic unit 11 increases because it also needs extra circuit to perform the synchronization.

SUMMARY OF THE INVENTION

The object of the present invention is to provide a computer system with a single memory bus so that the CPU performance can be improved by avoid wasting precious CPU cycles on bus synchronization, and waiting for memory with lower speed.

Another object of the present invention is to provide a computer system with a single memory bus so that the circuit complexity of CPU can be reduced due to the elimination of bus synchronization task, which, in turn, reduces the number of the pins required.

Yet another object of the present invention is to provide a bus-arbitration device which is capable of performing bus arbitration among a plurality of buses so that design and routing of multiple-bus computer systems can be simplified.

To achieve the aforementioned objects, the present invention adopts ASIC technology to provide a bus-arbitrator chip and redesign a novel architecture of a computer system. In the present invention, the program and sound memory and the graphic memory of FIG. 1 are consolidated into a program and sound and graphic memory, which communicates with the CPU/Sound/Graphic unit through a bus arbitrator with a single bus. The addition of the bus-arbitrator can relieve the CPU/Sound/Graphic unit from performing bus synchronization and waiting for the slow memory to catch up.

These and other objects, features and advantages of the invention will be apparent to those skilled in the art, from a reading of the following brief description of the drawings, the detailed description of the preferred embodiment, and the appended claims.

DETAILED DESCRIPTION OF THE INVENTION

Figure 1:
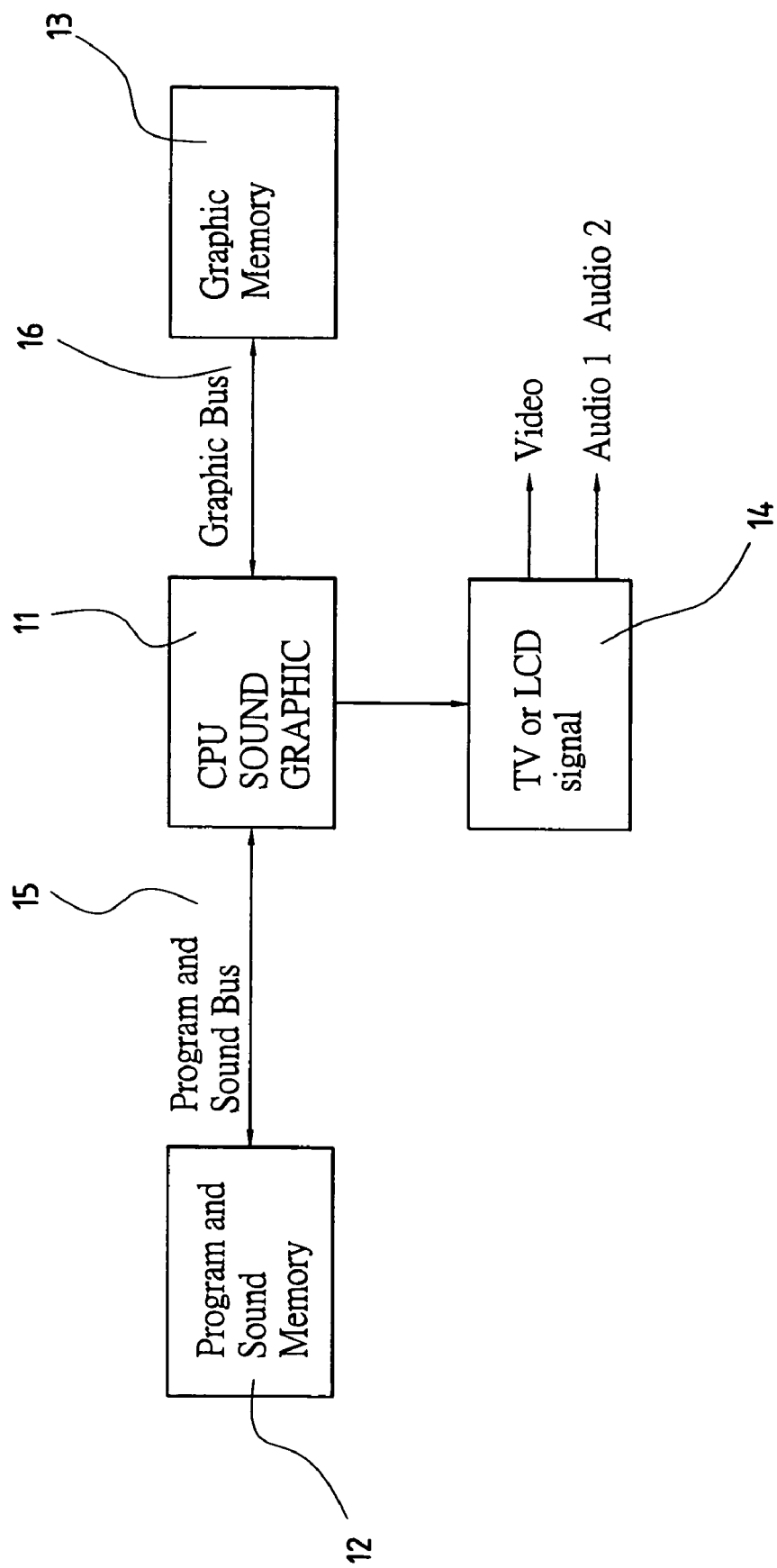
FIG. 1 shows a schematic view of a conventional two-bus computer system.
Figure 2:
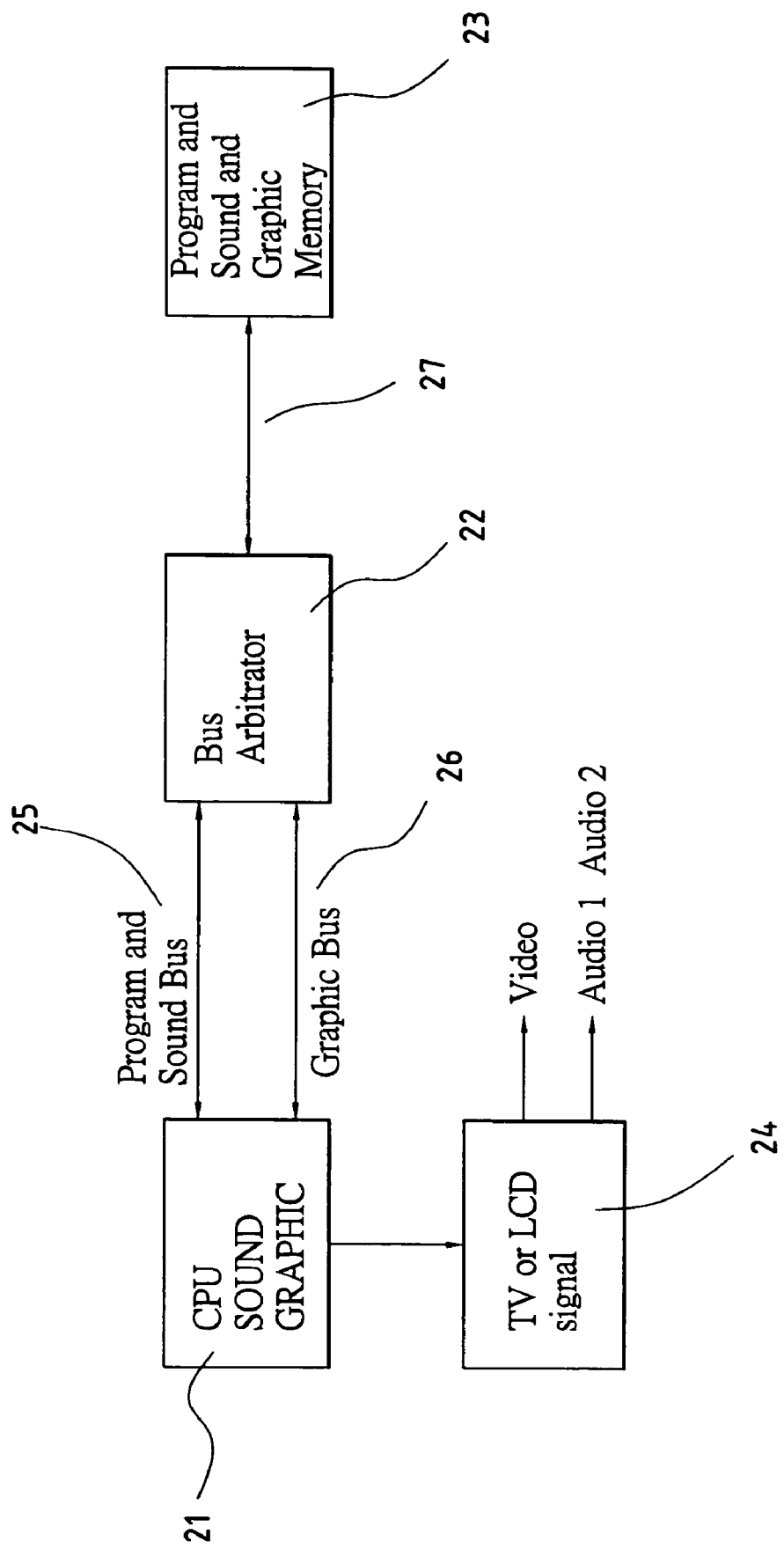
FIG. 2 shows a schematic view of a single memory bus computer system for the present invention.

As shown in FIG. 2, the present invention of a single memory bus multi-media computer system comprises a CPU/Sound/Graphic unit 21 connected to a program and sound bus 25 and a graphic bus 26, a bus arbitrator 22 connected to program and sound bus 25 and graphic bus 26 on one side, and single memory bus 27 on the other side, a program and sound and graphic memory 23 connected to single memory bus 27, and a TV/LCD signal unit 24 for outputting audio and video signals. CPU/Sound/Graphic unit 21 requests the program and sound and graphic memory 23 by memory addresses, processes data returned from program and sound and graphic memory 23, and sends the signals to TV/LCD signal unit 24 for outputting. Bus arbitrator 22 sits between CPU/Sound/Graphic 21 and program and sound and graphic memory 23 to arbitrate the memory requests from CPU/Sound/Graphic unit 21 to program and sound and graphic memory 23. Program and sound memory 12 and graphic memory 13 of FIG. 1 are consolidated into a program and sound and graphic memory 23, which communicates with CPU/Sound/Graphic unit 21 through a bus arbitrator 22 with a single memory bus 27. The addition of bus-arbitrator 22 can relieve CPU/Sound/Graphic unit 21 from performing bus synchronization and waiting for the slow memory to catch up.

Figure 3:
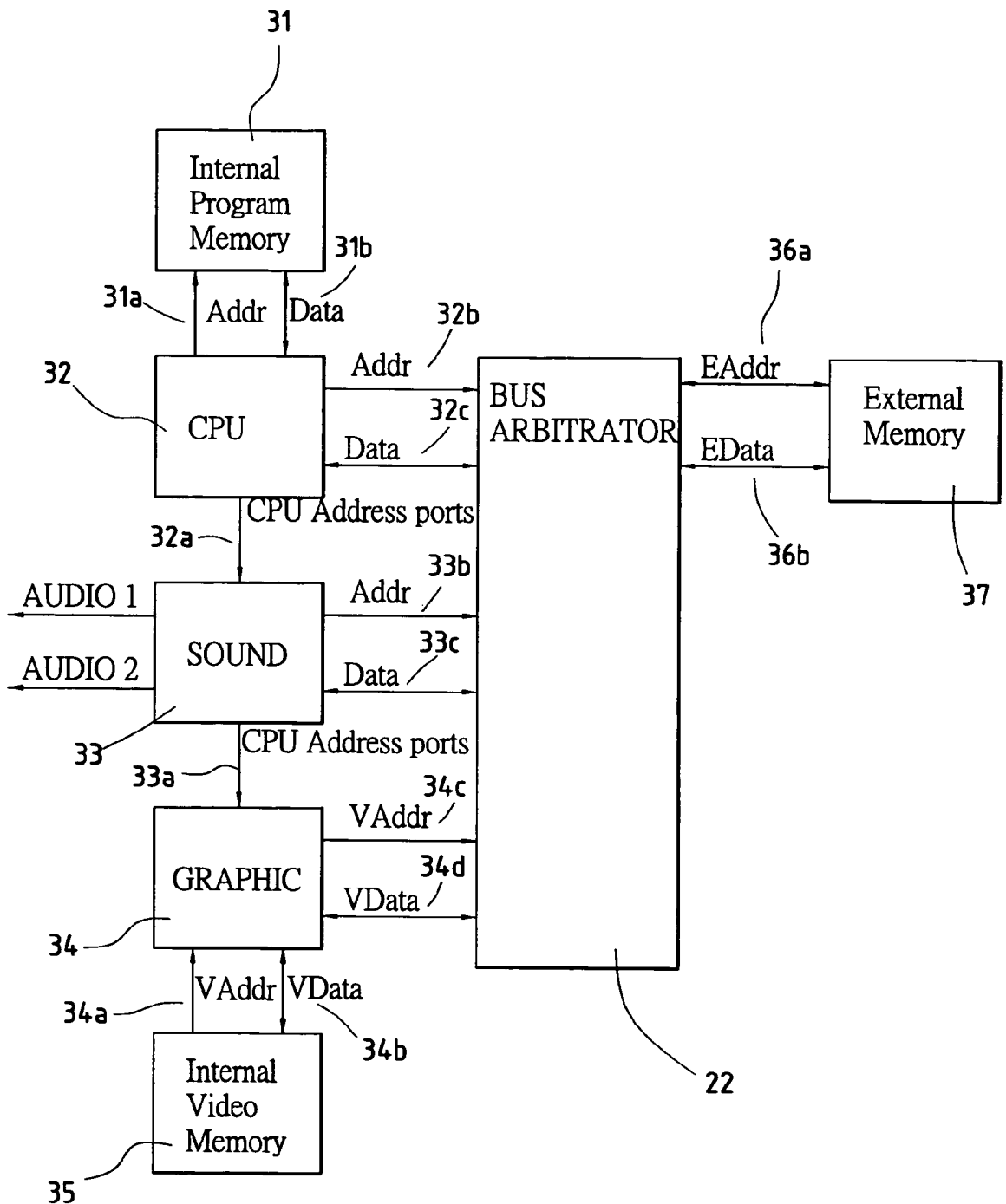
FIG. 3 shows a detailed block diagram of a single memory bus computer system of the present invention.

FIG. 3 shows a detailed block diagram of a computer system of the present invention. As shown in FIG. 3, the system includes a CPU 32, a sound unit 33, a graphic unit 34, and internal program memory 31, an internal video memory 35, a bus-arbitrator 22, and an external memory 37. Internal program memory 31 receives a memory request address from address bus 31a and exchanges the data for that memory address with CPU 32 through data bus 31b. CPU 32 also sends CPU address ports information 32a to sound unit 33, and relays CPU address ports information 33a to graphic unit 34. All CPU 32, sound unit 33, and graphic unit 34 send memory request addresses to bus arbitrator 22 through address buses 32b, 33b, and 34c, respectively. The data are exchanged from and to bus arbitrator 22 through data buses 32c, 33c, and 34d, respectively. An additional address bus 34a and data bus 34b are used by graphic unit 34 to communicate with internal video memory 35. Bus arbitrator 22 communicates with an external memory 37 through an address bus 36a and a data bus 36b. The outputs from sound unit 33 are audio1 and audio2 streams, and graphic unit 34 outputs video stream.

Basically, bus arbitrator 22 arbitrates the bus accessibility with the rule that a memory request to a faster memory is given a higher priority to access the bus without the preemptive capability. Hence, when the bus is available and two or more memories request to use the bus, the request to the memory having the fastest speed is given the highest priority, and the others will wait for their respective turn to access the memory. On the other hand, when the bus is unavailable and two or more memories request to use the bus, all the requests for the bus accessing are given a priority based on their memory speed, and wait for their respective turn. The memory currently accessing the bus will finish the use of bus regardless of its memory speed.

Figure 4:
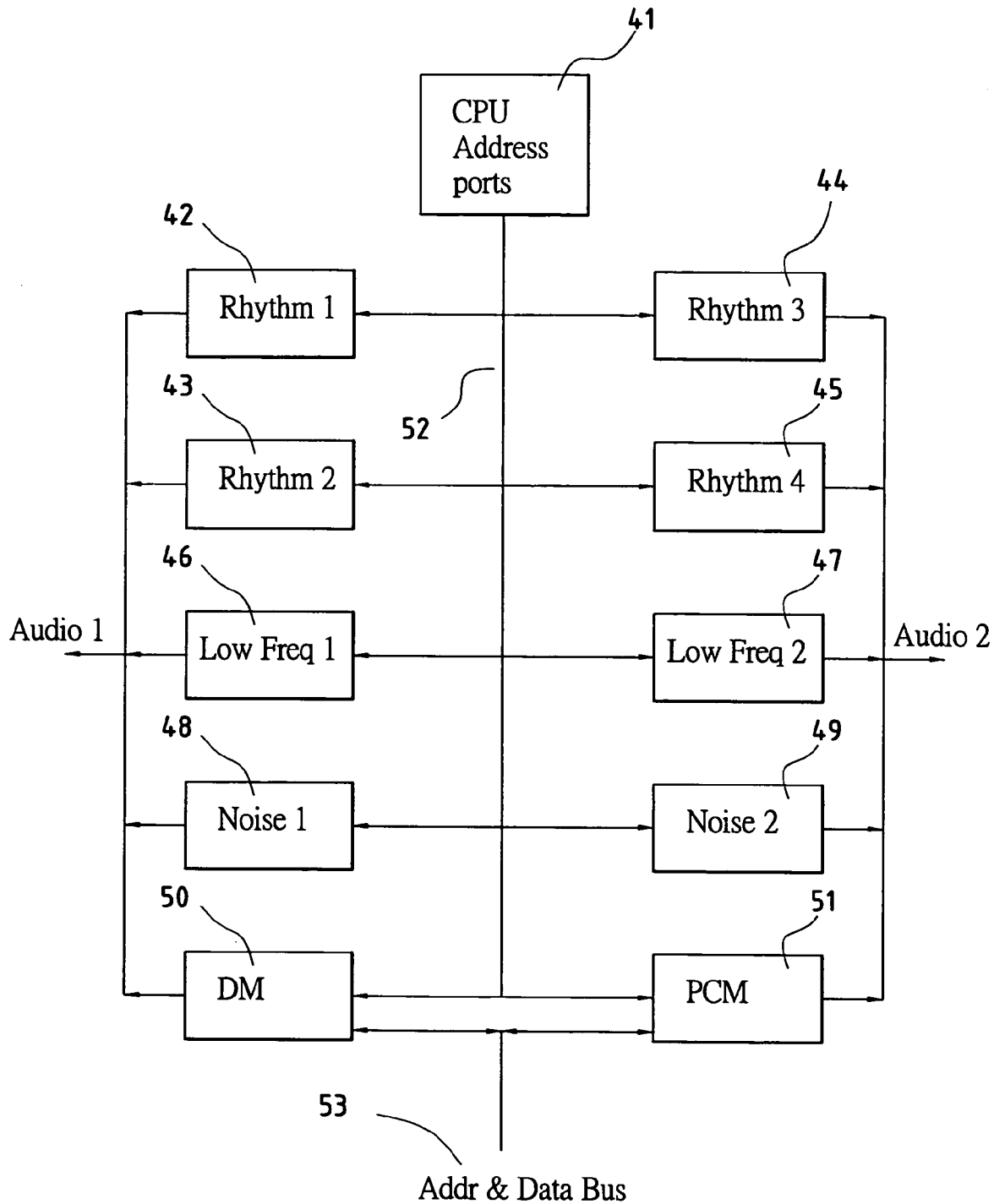
FIG. 4 shows a block diagram of the sound unit in a system of the present invention.

FIG. 4 shows a block diagram of the sound unit of the system of the present invention. As shown in FIG. 4, the sound unit includes four rhythm channels 42, 43, 44, 45, two low frequency channels 46, 47, two noise channels 48, 49, a built-in DM 50, and a built-in PCM 51. CPU address ports 41 provide signals for controlling the operation of the sound unit. The sound unit also includes two independent outputs that are a first audio and a second audio.

Figure 5:
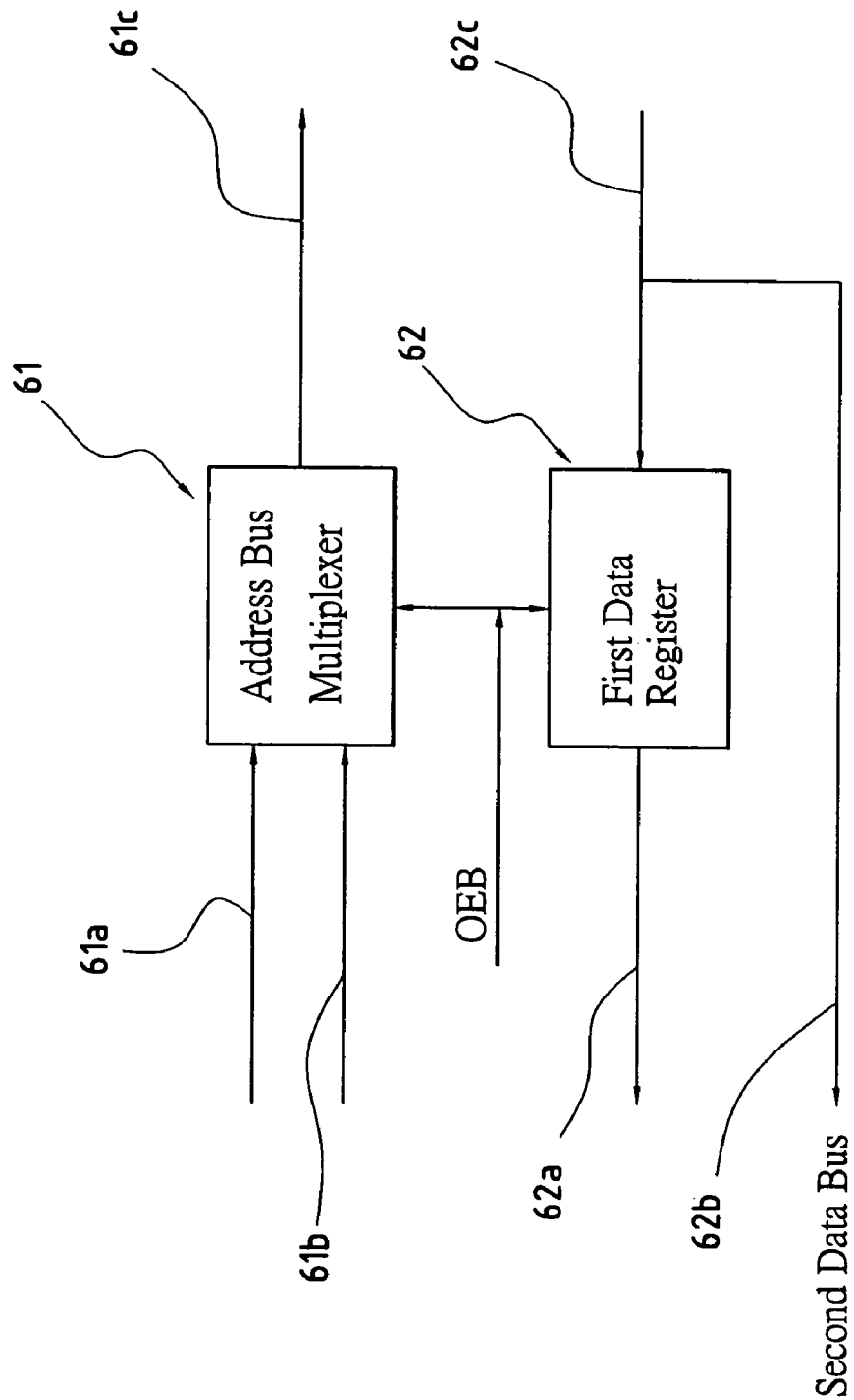
FIG. 5 shows a block diagram of the bus arbitrator in a system of the present invention.

FIG. 5 shows a block diagram of the bus arbitrator of the present invention. As shown in FIG. 5, the bus arbitrator includes an address bus multiplexer 61 and a first data register 62. Address bus multiplexer 61 takes two inputs, a first bus address 61a and a second bus address 61b, and multiplex to generate an output, one-bus address 61c. In the embodiment, the first bus 61a is a low frequency program and sound system bus, and the second bus 61b is a high frequency video bus. The data from one-bus, called one-bus data 62c, can be either temporarily stored in the first data register 62 or directly outputted to a second data bus. The operation of address bus multiplexer 61 and the first data register 62 is controlled by a bus control signal, second bus signal OEB. When the second bus signal OEB is low, the address bus multiplexer takes the second bus address 61b and outputs one-bus address 61c. At the same time, the first data register 62 stores the one-bus data 62c and outputs a first bus data 62a. On the other hand, when the second bus signal OEB is high, it is the accessing cycle for the first bus untill the second bus signal OEB becomes low. During the accessing cycle of the first bus, one-bus data is transported to the first bus data. The video system gets a second bus data 62b before the second bus signal OEB transits from low to high.

While the invention has been described in connection with what is presently considered to the most practical and preferred embodiment, it is to be understood that the invention is not to be limited to the disclosed embodiment, but, on the contrary, it should be clear to those skilled in the art that the description of the embodiment is intended to cover various modifications and equivalent arrangement included within the spirit and scope of the appended claims.

What is claimed is:

1. A single memory bus multi-media computer system, comprising:
    a CPU/Sound/Graphic unit connected to a program and sound bus and a graphic bus;
    a bus arbitrator connected to said program and sound bus and said graphic bus on a first side, and a single memory bus on a second side, said bus arbitrator including an address bus multiplexer for receiving a program and sound bus address and a graphic bus address as inputs, and outputting a single memory bus address, and a first data register for storing memory data from said single memory bus, said memory data being controlled by a bus control signal OEB for being temporarily stored in said first data register or directly outputted to a graphics data bus;
    a program and sound and graphic memory connected to said single memory bus; and
    a TV/LCD signal unit for outputting audio and video signals;
    wherein said CPU/Sound/Graphic unit requests said program and sound and graphic memory by memory addresses, processes data returned from said program and sound and graphic memory, and sends signals to said TV/LCD signal unit for outputting, said bus arbitrator sits between said CPU/Sound/Graphic and said program and sound and graphic memory to arbitrate the memory requests from said CPU/Sound/Graphic unit to said program and sound and graphic memory.

2. The system as claimed in claim 1, wherein said single memory bus further comprises an address bus for sending address and a data bus for sending data.

3. The system as claimed in claim 1, wherein said program and sound bus further comprises an address bus for sending address and a data bus for sending data.

4. The system as claimed in claim 1, wherein said graphic bus further comprises an address bus for sending address and a data bus for sending data.

5. The system as claimed in claim 1, wherein said bus arbitrator uses a rule that a memory request to a faster memory is given a higher priority to access said single memory bus without pre-emptive capability.

6. The system as claimed in claim 1, wherein said bus control signal OEB controls the operation of said address multiplexer and said first data register with the following rules:
    (a) when said bus control signal OEB is low, said address bus multiplexer takes said graphics bus address for outputting said single memory bus address, at the same time, said first data bus register stores said single memory bus data and outputs said program and sound bus data;
    (b) when said bus control signal OEB is high, it is the accessing cycle for said program and sound bus untill said bus control signal OEB becomes low, during the accessing cycle of said program and sound bus, said single memory bus data is transported to said program and sound bus data; and
    (c) said graphics bus gets said graphics bus data before said bus control signal OEB transits from low to high.

7. A system chip for processing audio and video data, comprising:

a CPU/Sound/Graphic unit connected to a program and sound bus and a graphic bus;

a bus arbitrator connected to said program and sound bus and said graphic bus on a first side, and a single memory bus on a second side, said bus arbitrator including an address bus multiplexer for receiving a program and sound bus address and a graphic bus address as inputs, and outputting a single memory bus address, and a first data register for storing memory data from said single memory bus, said memory data being controlled by a bus control signal OEB for being temporarily stored in said first data register or directly outputted to a graphics data bus;

a program and sound and graphic memory connected to said single memory bus; and a TV/LCD signal unit for outputting audio and video signals;

wherein said CPU/Sound/Graphic unit requests said program and sound and graphic memory by memory addresses, processes data returned from said program and sound and graphic memory, and sends signals to said TV/LCD signal unit for outputting, said bus arbitrator sits between said CPU/Sound/Graphic and said program and sound and graphic memory to arbitrate the memory requests from said CPU/Sound/Graphic unit to said program and sound and graphic memory.

* * * * *